Patented Apr. 18, 1939

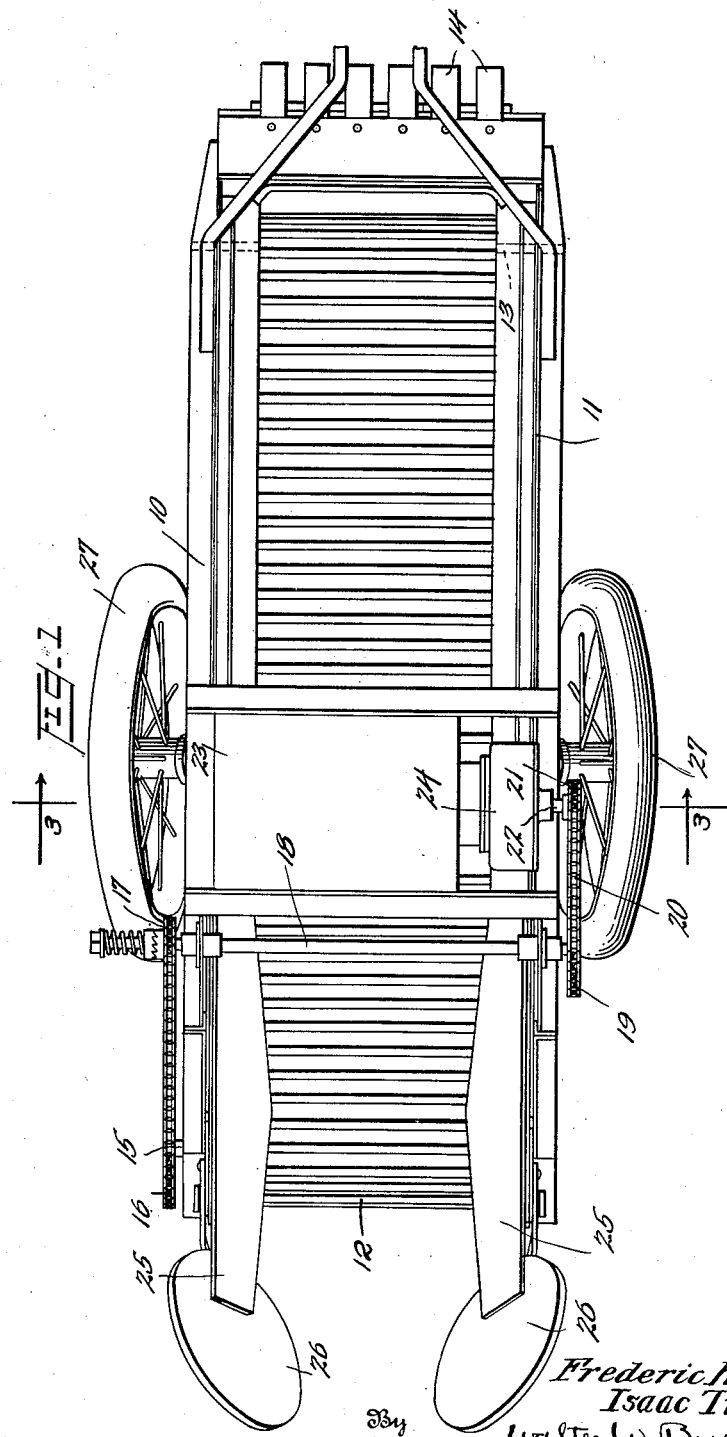

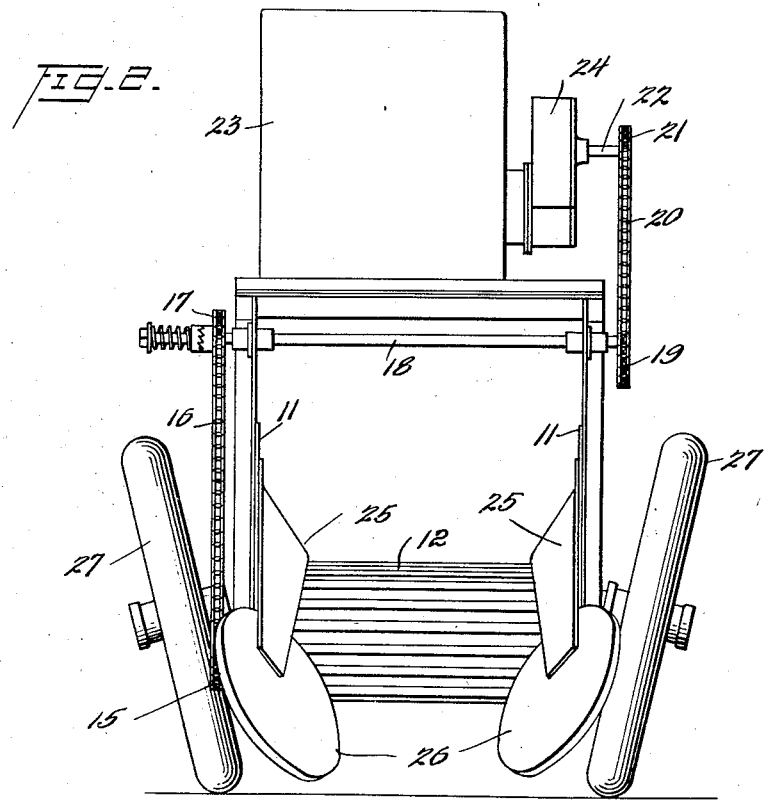
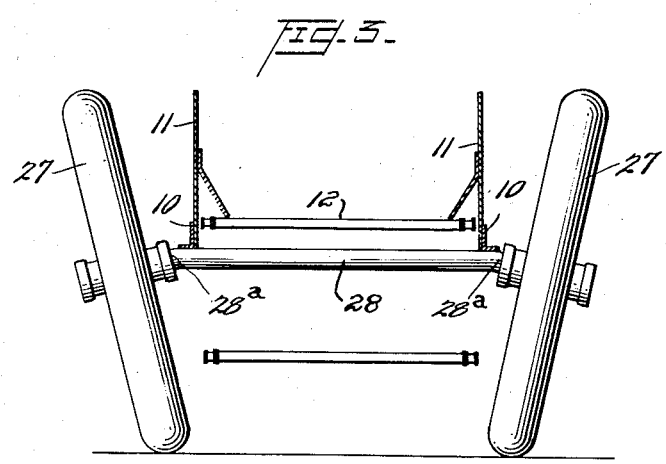

2,154,429

UNITED STATES PATENT OFFICE 2,154,429

POTATO DIGGER

Frederic H. Bateman, Grenloch, N. J., and Isaac Trolley, York, Pa., assignors to Fred H. Bateman Company, Camden, N. J., a corporation of New Jersey Application March 1, 1937, Serial No. 128,536

5 Claims. (Cl. 55—51)

This invention relates to potato diggers and has particular relation to potato diggers provided with conveyors for the purpose of separating the potatoes from the soil and depositing the former on the ground without injury.

After potato seeds are planted and the plants have started to develop under the ground, the greatest problem of potato raising from then until the harvesting is completed, is to prevent injury to the vines, roots and to the potatoes.

In many parts of the world, due to the desire to utilize to the utmost, all of the available land surface for planting, it is the custom to plant the rows very close together. When rows of potatoes are placed close together, the matter of harvesting becomes a serious problem for the reason that when a potato digging machine is used, it has been found that the wheels which support the digger must roll on the adjacent row with consequent injury to the potatoes not yet dug. If the wheels are placed closer together and the conveyor made correspondingly narrower, the conveyor will then miss some of the potatoes during the digging operation. If these narrow rows are ridged as is often the case, it is impossible to operate the digger. This is for the reason that the wheels run up on the sides of the ridges, thus tilting the digger and causing an irregular depth of digging.

For these reasons, it has become the custom in some localities to dig all potatoes by hand, thus avoiding the loss caused by the injury to the potatoes.

In addition, where rows are placed sufficiently far apart, to permit the use of a digger, it is necessary to manufacture and carry in stock, many different widths of diggers to meet the various needs of potato growers. These potato diggers are now made in widths from 18 inches wide to 27 inches wide for a single row.

The primary purpose of this invention is the provision of an improved potato digger.

Another object of this invention is the provision of an improved potato digger having a very narrow tread relative to the width of the digger.

A still further object of the invention is the provision of an improved potato digger having a conveyor for conducting the soil and potatoes to a position so that they may be separated and with wheels having treads which are substantially beneath the sides of the conveyor edges.

Another and still further object of this invention is the provision of an improved potato digger having supporting wheels which have a tread width not substantially greater than the width of the body of the digger.

Another and still further object of the invention is the provision of an improved potato digger having an axle for the ground wheels, the axle ends being bent downwardly to place the wheel treads closer together than would otherwise be the case.

Other and further objects of the invention will be apparent to those skilled in the art from a reading of the specification and claims.

Referring to the drawings wherein is illustrated an embodiment of the invention, Fig. 1 is a top view of the digger.

Fig. 2 is a rear view showing the ground engaging portions of the wheels relative to the earth separating means and Fig. 3 is a cross section on the line 3—3 of Fig. 1 most of the parts being omitted to more clearly show the relation of the ground wheels to the digger frame.

In the drawings, 10 designates the frame of the potato digger. Side walls 11 of the separating means are secured to the frame 10 and prevent the potatoes and vines from passing over the sides of the separating means 12. This separating means 12 is, in the illustrated embodiment, an endless conveyor. The forward end of the conveyor 12 is mounted on a shaft 13 in such a way as to receive the dug earth and potatoes from the plow member 14 and carry them to the rear while the movement of the flights or slats of the conveyor separating means, separates the potatoes from the earth, the latter falling between the slats onto the ground.

The conveyor 12 is supported at its rear end by sprocket wheels on the shaft 15, which shaft is rotated by a suitable sprocket wheel driven by a drive chain 16 which is driven at its upper end by a sprocket wheel 17. This sprocket wheel 17 is mounted on the shaft 18. At the opposite end of the shaft 18 is a sprocket 19 which is driven by a sprocket chain 20 from a sprocket wheel 21. This sprocket wheel 21 is mounted on and is driven by the shaft 22 of the motor 23. A suitable clutch mechanism 24 is mounted in the shaft sections of the shaft 22 and controls the operation or non-operation of the shaft 22 and the parts driven thereby.

Flexible guides 25 are provided at the sides of the conveyor separating means 12. At the rear or discharge end of the conveyor 12, are the delivery disks 26 which are preferably covered with soft rubber and freely revolve to lessen the shock to the potatoes as the latter are being discharged.

All of these features are shown in our Patent 2,071,325.

In carrying out the invention, it is desired to have the width of the wheel tread not substantially greater than the width of the body of the digger. In the embodiment herein shown and described, there is provided a supporting axle 28, the ends of which are bent downwardly at 28ª as shown in Fig. 3. By placing the wheels 27 on the outer bent portions 28ª of the axle 28, the wheels 27 are made to assume a position where the center of the hub and the upper point of the periphery of the tread are outward of the portion of the wheel which contacts with the ground. This brings the ground contacting area of the wheel inward of the normal position to a point preferably substantially below the corresponding edge of the conveyor separator 12. By doing this, a wider conveyor is permitted for a given tread. Considering it another way, a narrower tread width is permitted for a given conveyor width.

This construction permits of a width of conveyor and plow which will allow the gathering of all of the potatoes of a given width of row without having the wheels in positions where they will injure the undug or dug potatoes of adjacent rows.

By this construction, having the wheel treads inward of the normal position, it is possible to avoid many difficulties. For example, many potatoes are planted in this country in wider rows than growers would like to plant, wholly due to the fact that if they planted them in narrow rows, it would be impossible to dig the potatoes without injury.

By using this invention, it is possible to use a digger having a sufficiently wide apron or conveyor to take care of the various conditions found in different localities and in the same locality from year to year while still having the wheels close enough to the row being dug to avoid injury to the adjacent undug potatoes. It is thus clear that a single size digger can be made to meet practically all single-row conditions. In this way the amount of stock to be kept on hand by the dealer is reduced to a minimum and the losses from non-sale of unused sizes is entirely done away with.

While we have illustrated and described in detail an embodiment of our invention, we desire to have it understood that the disclosure is merely illustrative and that modifications and changes may be made without departing from the spirit and within the scope of the invention as claimed.

Having described the invention, what we claim is:—

1. A potato digger having a digging means, means for separating the earth from the potatoes, supporting wheels for the digger, one of the wheels having its ground engaging portion substantially beneath the edge of the separating means, the wheel being tilted outwardly relative to the vertical.

2. A potato digger having a separating means including a conveyor, a wheel axle and supporting wheels, the wheels and axles being so constructed as to place the ground engaging portions of the wheels at their bottoms substantially beneath the edges of the conveyor, the wheels being tilted upwardly and outwardly away from each other.

3. A potato digger having a separating means, a wheel axle and supporting wheels, the axles being bent downwardly at their ends to cause the wheels to tread on the ground along lines substantially beneath the conveyor edges the separating means including a rearwardly moving conveyor of a width substantially equal to the width of the digger tread.

4. A potato digger comprising a frame, supporting wheels and means for separating the potatoes from the earth, the supporting wheels being so placed that the tread of the digger will be not substantially greater than the width of the separating means, the wheels being tilted upwardly and outwardly away from each other.

5. A potato digger comprising a frame, axle bearings, supporting wheels, and means for separating the potatoes from the earth, the supporting wheels being so supported on their axle bearings that the wheel hub centers are outward of the centers of the wheel ground-bearing surfaces the separating means including a rearwardly moving conveyor of a width substantially equal to the width of the digger tread.

FREDERIC H. BATEMAN.
ISAAC TROLLEY.